(12) United States Patent
Boyd et al.

(10) Patent No.: US 10,636,034 B2
(45) Date of Patent: Apr. 28, 2020

(54) AUTHENTICATED PURCHASE OF RESTRICTED ITEMS

(71) Applicant: Walmart Apollo, LLC, Bentonville, AR (US)

(72) Inventors: Ruth A. Boyd, Bentonville, AR (US); Meriah D. Montondo, Rogers, AR (US); Kellie D. Embree, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 260 days.

(21) Appl. No.: 15/410,402

(22) Filed: Jan. 19, 2017

(65) Prior Publication Data
US 2017/0221060 A1 Aug. 3, 2017

Related U.S. Application Data

(60) Provisional application No. 62/289,746, filed on Feb. 1, 2016.

(51) Int. Cl.
*G06Q 20/40* (2012.01)
*G06Q 20/20* (2012.01)
*G07F 9/02* (2006.01)

(52) U.S. Cl.
CPC ....... *G06Q 20/4014* (2013.01); *G06Q 20/201* (2013.01); *G06Q 20/405* (2013.01); *G07F 9/026* (2013.01)

(58) Field of Classification Search
CPC ............. G06Q 20/4014; G06Q 20/201; G06Q 20/405; G07F 9/026
(Continued)

(56) References Cited

U.S. PATENT DOCUMENTS 6,522,772 B1 * 2/2003 Morrison ............. G06Q 20/208
235/383
6,792,334 B2 9/2004 Metcalf et al.
(Continued)

FOREIGN PATENT DOCUMENTS

JP 2016053908 A * 4/2016

OTHER PUBLICATIONS

"Honeywell Scanning for Age Verification at the POS," Barcodesinc.com, Oct. 26, 2011; 2 pages.
(Continued)

*Primary Examiner* — Luna Champagne
(74) *Attorney, Agent, or Firm* — Schmeiser, Olsen & Watts LLP; Timothy P. Collins

(57) ABSTRACT

A point of sale (POS) is programmed to add unrestricted items to a transaction. In response to presentation of unique customer identification, the customer's identity is verified by transmitting an image associated with the unique identification to the POS. In response to receiving verification that the image corresponds to the presenter of the unique identification, a self-checkout interface is displayed by the POS. Restricted items are input by the customer and, if the customer is determined eligible to purchase the restricted items, they are added to the transaction. Payment for both restricted and unrestricted items in the transaction is then processed. Eligibility may be determined on a server system that determines the customer's age and possibly one or more other eligibility criteria.

19 Claims, 7 Drawing Sheets

(58) Field of Classification Search
USPC .......................................................... 705/20
See application file for complete search history.

(56) References Cited

U.S. PATENT DOCUMENTS

| | | | |
|---|---|---|---|
| 7,931,194 B2 | 4/2011 | Keys | |
| 8,473,351 B1 | 6/2013 | Mollett et al. | |
| 2003/0177102 A1 | 9/2003 | Robinson | |
| 2006/0266823 A1 | 11/2006 | Passen et al. | |
| 2008/0269947 A1* | 10/2008 | Beane | G06Q 20/12 700/237 |
| 2009/0132381 A1* | 5/2009 | Gangi | G06K 7/0004 705/18 |
| 2011/0225055 A1* | 9/2011 | Takahashi | G06Q 20/20 705/16 |
| 2013/0191230 A1* | 7/2013 | Edwards | G06Q 20/20 705/16 |
| 2014/0201100 A1 | 7/2014 | Rellas et al. | |
| 2014/0372233 A1* | 12/2014 | Knecht | G06Q 20/20 705/15 |
| 2015/0186963 A1 | 7/2015 | Rellas et al. | |

OTHER PUBLICATIONS

"TCx Amplify," Toshiba Commerce, https://www.toshibacommerce.com/wps/portal/marketing/?urile=wcm:path:/en/home/products/software/applications/tcxamplify, Jun. 18, 2019.

"NCR Automates Age Approval at the Self-Checkout with Age Verification Technology from Yoti," NCR, https://www.ncr.com/news/newsroom/news-releases/retail/ncr-automates-age-approval-at-the-self-checkout-with-age-verification-technology-from-yoti, Oct. 17, 2018.

* cited by examiner

AUTHENTICATED PURCHASE OF
RESTRICTED ITEMS

RELATED APPLICATIONS

This application claims priority to U.S. Provisional Patent Application No. 62/289,746, filed Feb. 1, 2016 and entitled "Authenticated Purchase of Restricted Items," the entirety of which is incorporated by reference herein.

BACKGROUND

Field of the Invention

This invention relates to systems and methods for conducting transactions at a point of sale.

Background of the Invention

Many products have legal restrictions on their purchase. For example, products such as alcohol and cigarettes may only be sold to customers over a certain age. In some jurisdictions, a cashier selling such items must also be over the age limit. The systems and methods disclosed herein provide an improved approach for performing permissible transactions for restricted items.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
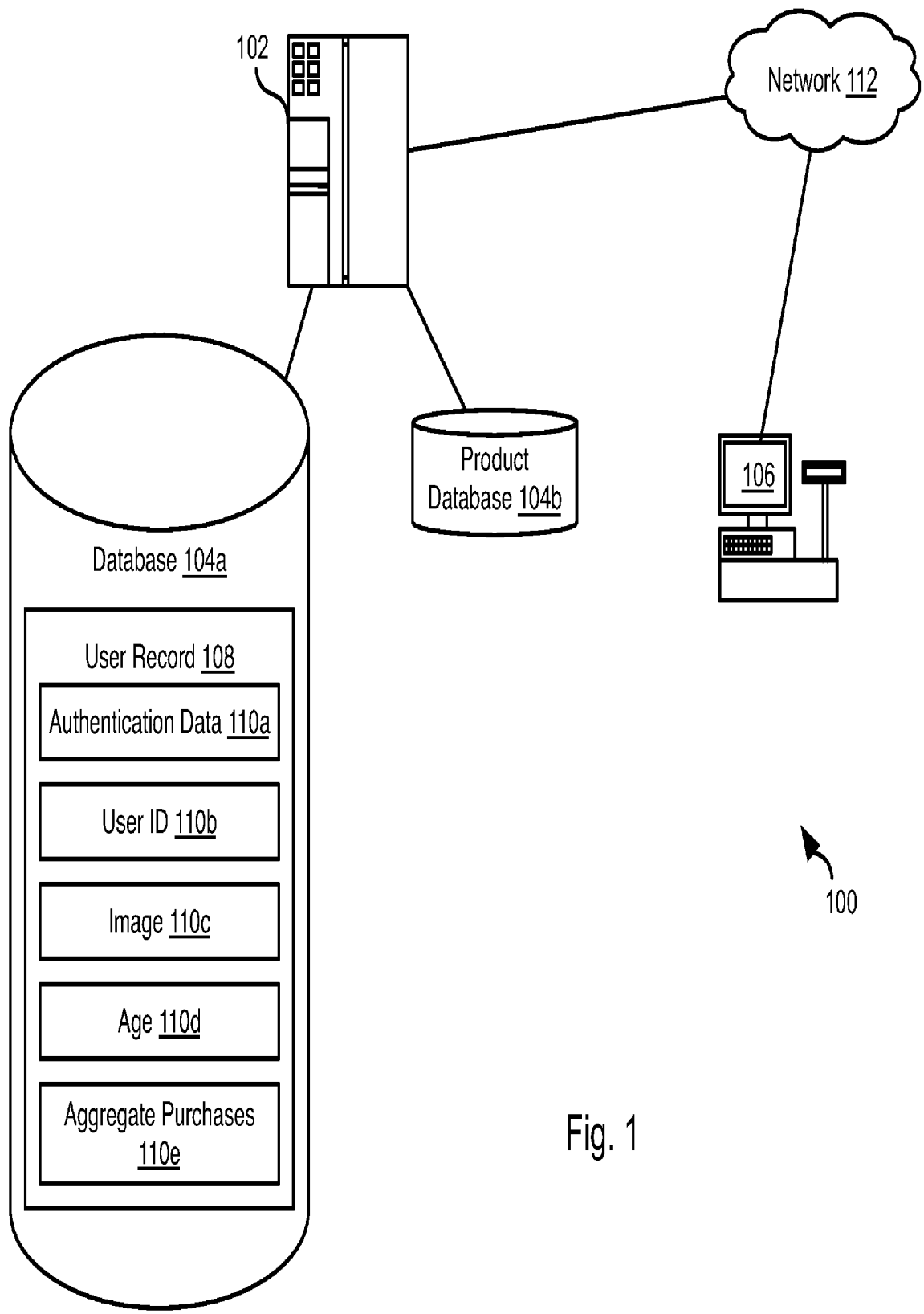
FIG. 1 is a schematic block diagram of a network environment suitable for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102 associated with an entity. The server system 102 may host or access one or more databases 104a, 104b and interact with a point of sale device (POS) 106. The POS 106 may report transactions to the server system 102 and may interact with the server system 102 to authorize users and determine whether purchase of a particular product is authorized. The methods by which users are authorized and permission for a particular user to purchase a product is determined are described in greater detail below. The POS 106 may be coupled to the server system 102 by means of a network 112, such as a local area network (LAN), wide area network (WAN), the Internet, or any other type of wired or wireless network.

The database 104a may store user records 108 used to authenticate a user and determine the permission of the user to purchase a particular product. For example, the user record 108 may include authentication data 110a. In some implementations, a user may be provided a unique identification, such as a key fob, radio frequency identifier (RFID) tag, or other physical object bearing a symbol, code, circuit, or other information or device that uniquely identifies the user. The unique identification may be provided to the user only after verifying information about the user, such as an image of the user, the age of the user, a real name of the user, and the like. The authentication data 110a may map the unique identification to the user. For example, a value encoded by the unique identification or mapped to the unique identification may be stored in the authentication data 110a. The authentication data may include a conventional username and password or any other type of authentication data.

The user record 108 may further include a user identifier 110b, an image 110c of the user, and a verified age (e.g. birth year) 110d of the user. The user record 108 may further include aggregate purchases 110e of the user. For example, a product may be purchased in only limited quantities. Accordingly, past purchases of the product by the user may be aggregated and stored in the aggregate purchases 110e, e.g. an amount of purchases within an X sized window preceding the current date may be recorded in the aggregate purchases 110e, where the user may only purchase Y amount of the product within an X sized period.

The database 104b may be a product database and include product records that list any restrictions on the purchase thereof. For example, restrictions for a product may include an age limit or an aggregate purchase limit window X and the amount Y of the product that may be purchased within the window Y.

Figure 2:
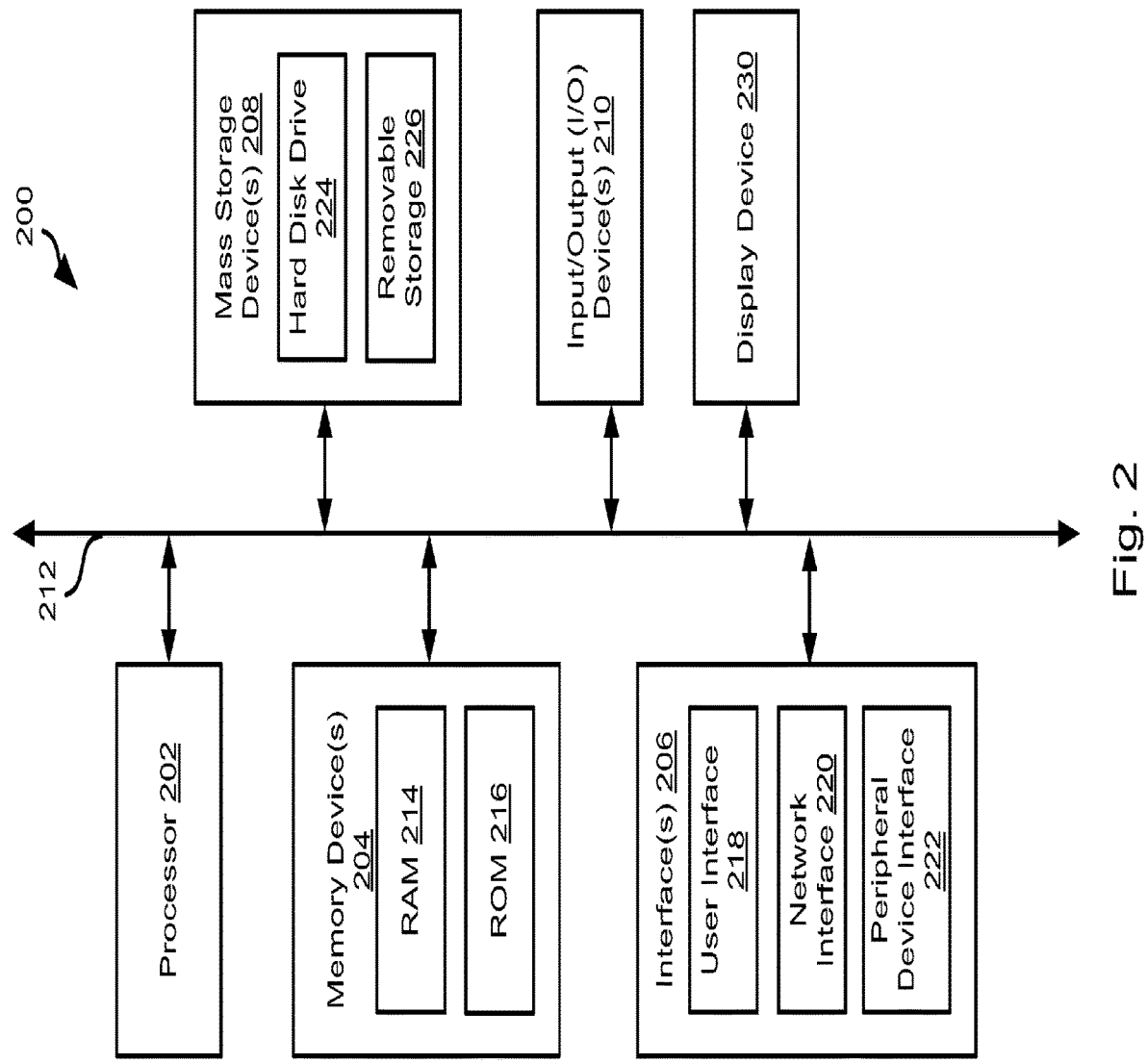
FIG. 2 is a schematic block diagram of an example computing device suitable for implementing methods in accordance with embodiments of the invention.

FIG. 2 is a block diagram illustrating an example-computing device 200. Computing device 200 may be used to perform various procedures, such as those discussed herein. The server system 102 and POS 106 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. The server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
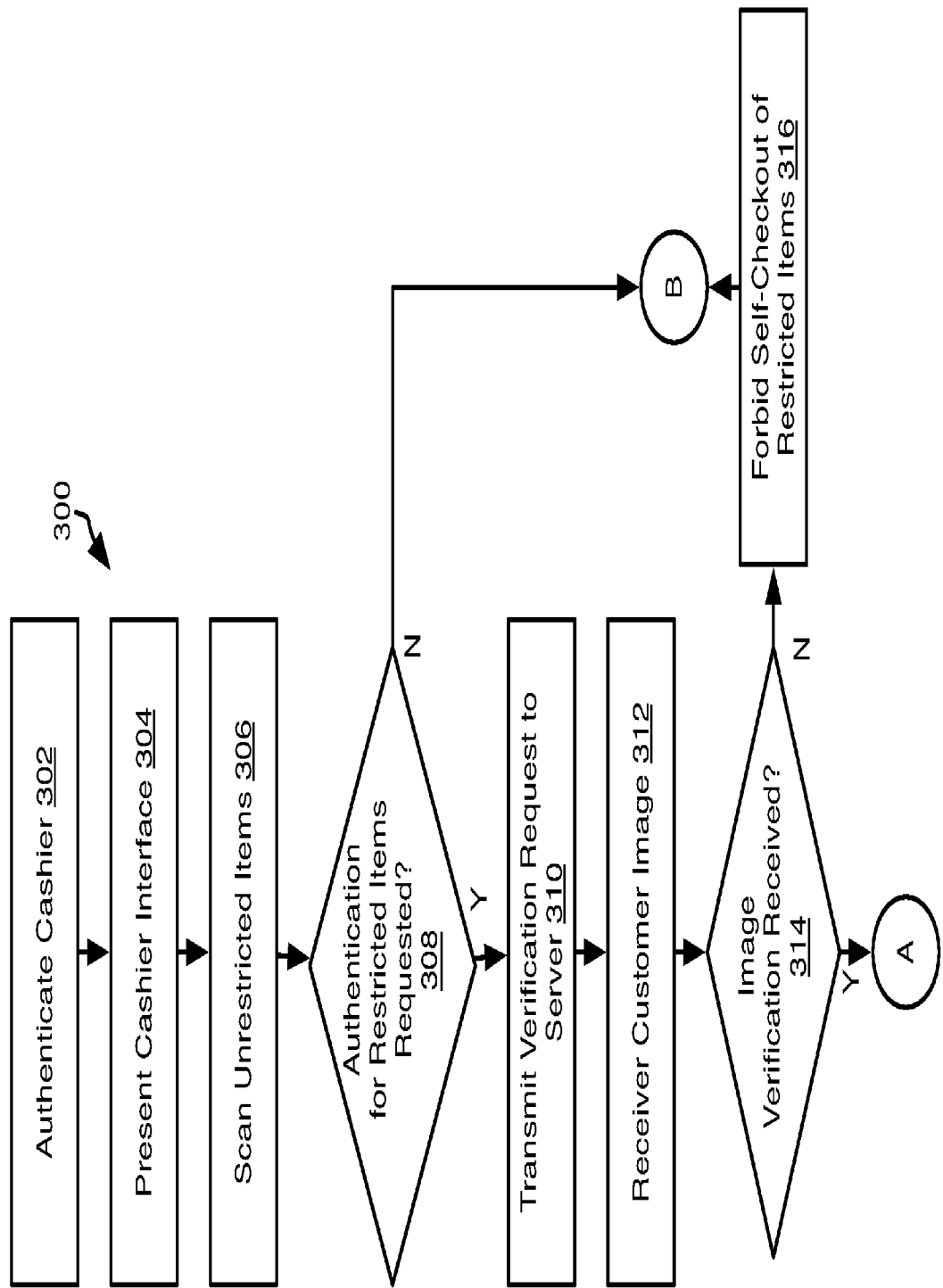
FIGS. 3A and 3B are process flow diagrams of a method for processing transactions including restricted items in accordance with an embodiment of the present invention.
Figure 3B:
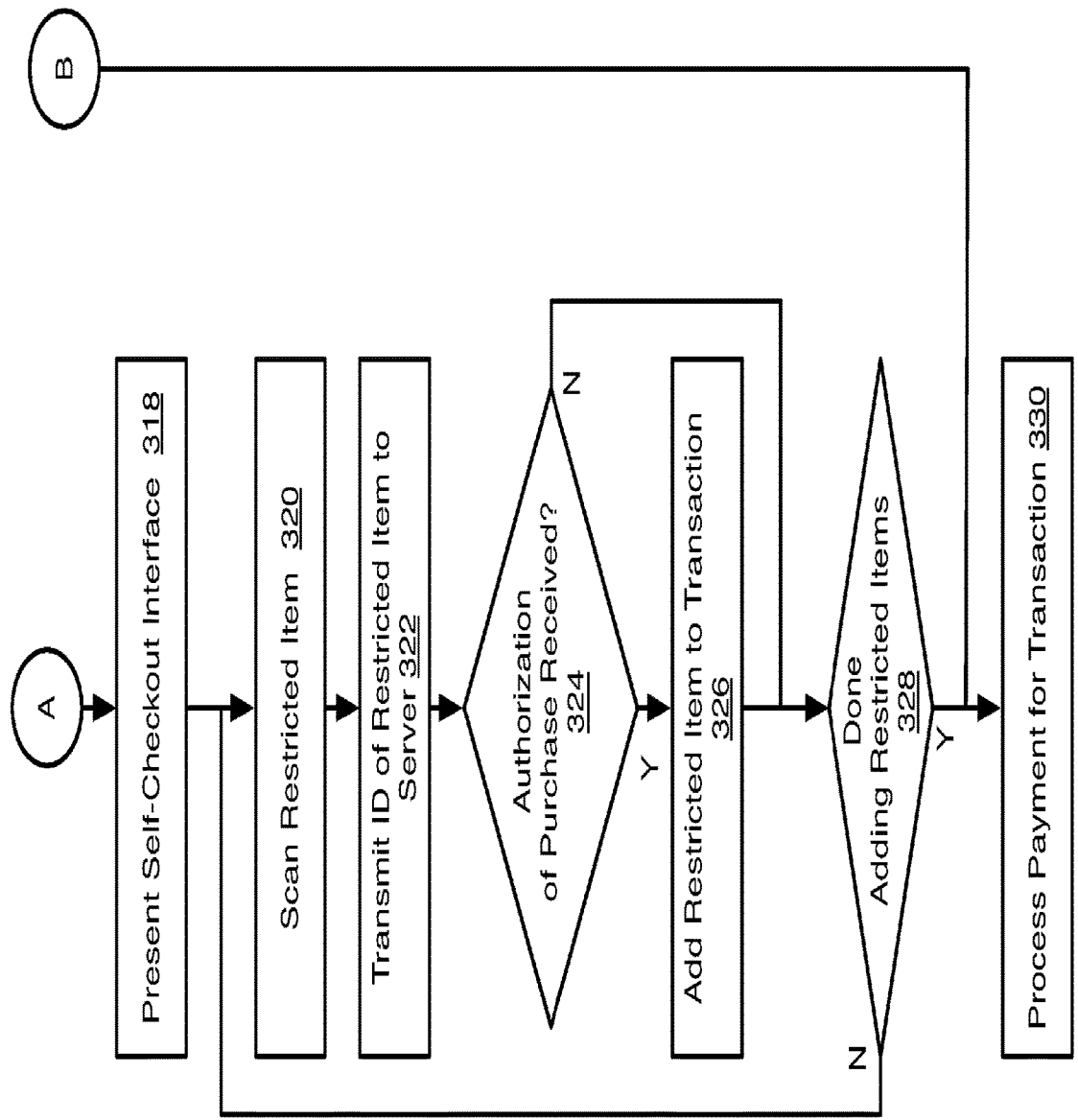

Referring to FIGS. 3A and 3B, the network environment 100 may implement and/or execute the illustrated method 300. In particular, the method 300 may be executed by the POS 106 with interaction with the server system 102 as noted in the description below.

The method 300 may include authenticating 302 a cashier, presenting 304 a cashier interface, and scanning 306 one or more unrestricted items and adding them to a transaction using the cashier interface. The manner by which items are scanned and identifiers thereof are added to an electronic record of a current transaction may be performed according to any method known in the art, such as a bar code scanning system or manual entry of a product code.

Figure 4A:
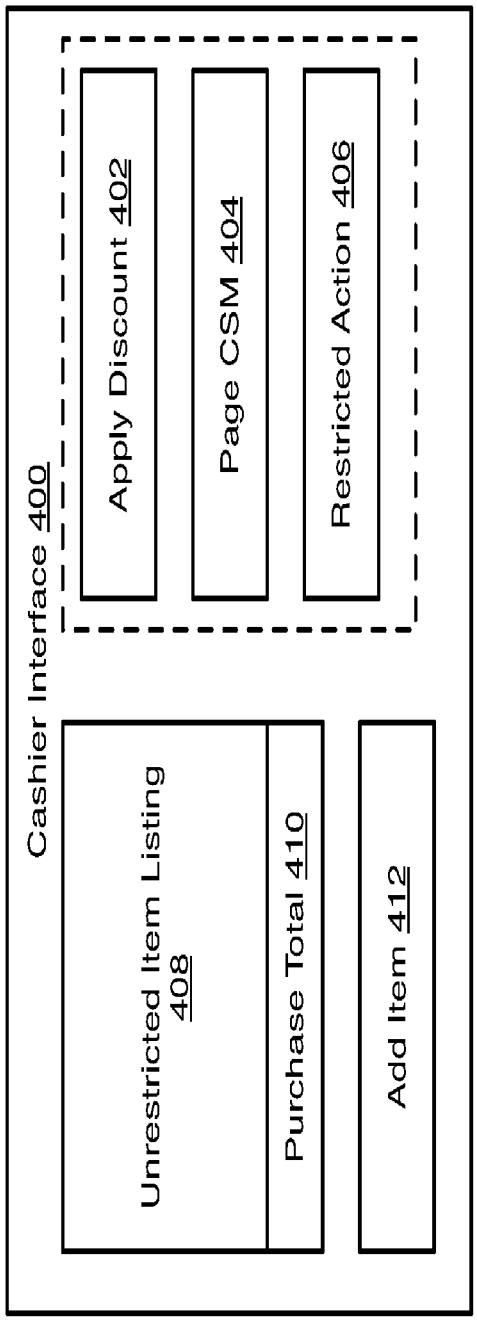
FIGS. 4A to 4D are diagrams of interfaces for conducting transactions in accordance with an embodiment of the present invention.

Referring to FIG. 4A, the cashier interface 400 may include functions for inputting items to a transaction manually or through a laser scanner and may further include user interface elements that invoke actions requiring authentication. For example, element 402 may apply a discount to one or more items of a transaction, such as part of a price-matching program. Element 404 may invoke paging of a customer service manager (CSM) or other store representative. One or more other elements 406 may invoke performance of one or more other actions by the POS 106 that require cashier authentication as known in the art of POS design and retail transactions.

The interface 400 may further include user interface elements 408-412 that are also used in a self-checkout interface 420. For example, element 408 may include a listing of items added to a transaction that are not restricted. Element 410 may disclose the total purchase price of a transaction. Element 412 may invoke addition by the POS 106 of an item to the transaction through manual entry of an identifier, scanning of barcodes, or other means known in the art.

Figure 4B:
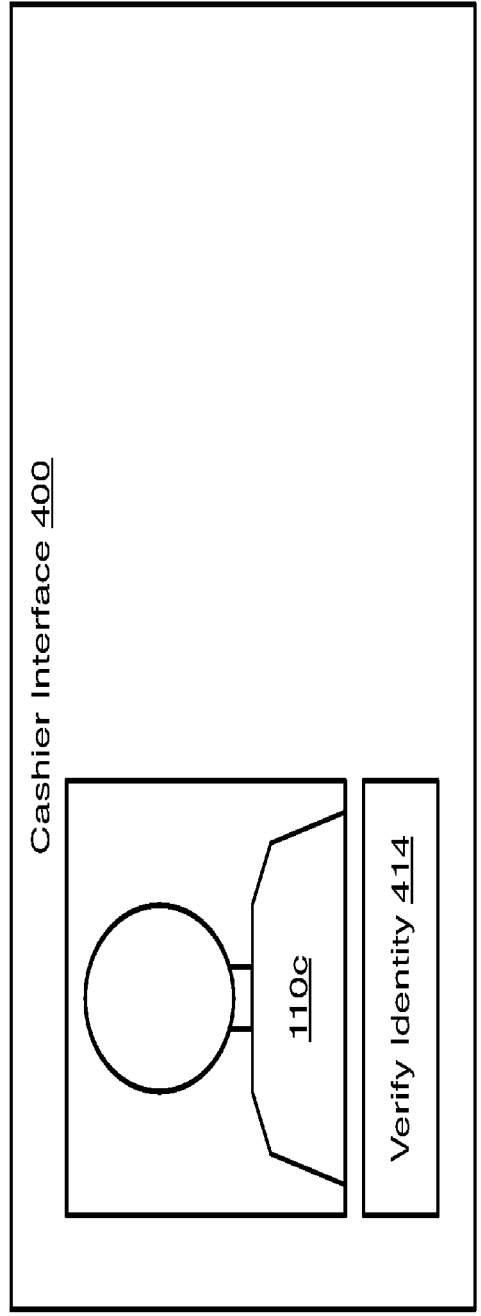

Referring again to FIG. 3A, the method 300 may further include determining 308 whether a user for the transaction that is the subject of the method 300 desires to purchase one or more restricted items. Step 308 may include detecting of the unique identification discussed above (e.g. key fob, RFID tag, unique alphanumeric identifier, or the like). If no restricted items are to be added to the transaction, then the method continues as shown in FIG. 3B. If restricted items are determined 308 to be requested to be added to the transaction, then the method 300 may include transmitting 310 a verification request to the server system 102. In response to the request, the server system 102 looks up the user record 108 corresponding to the identification data included in the request of step 310 and returns the image 110c from the record 108. The POS 106 receives 312 the image and displays it in the cashier interface 400 along with an interface element 414 enabling the cashier to either input confirmation that the image corresponds to the presenter of the unique identification or does not correspond thereto (see FIG. 4B).

Figure 4C:
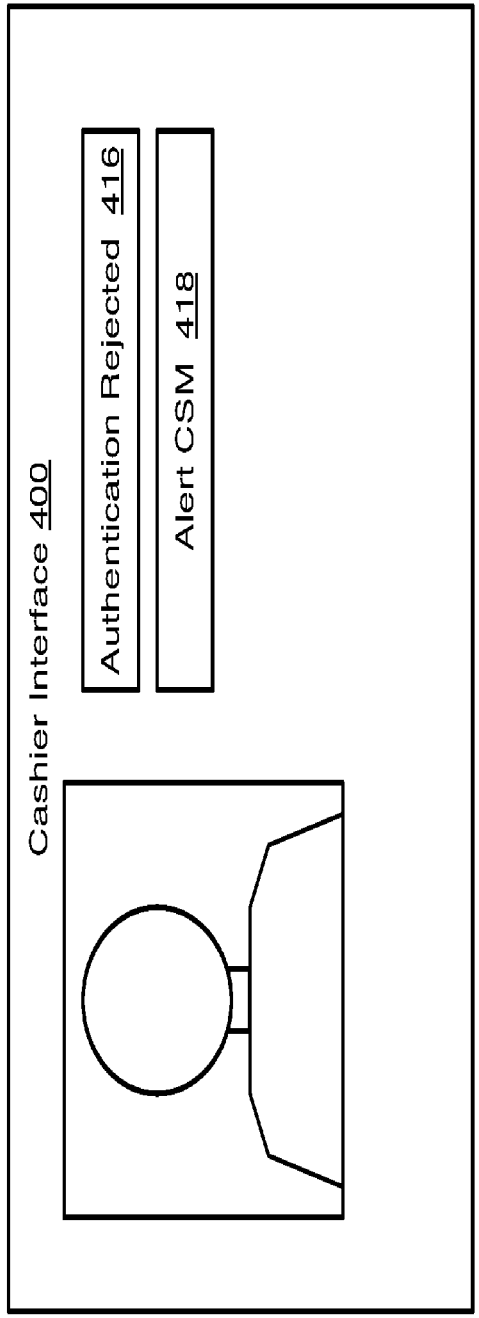

If an input is found 314 to have been received by the POS 106 indicating that the image does not correspond to the presenter of the unique identification, then self-checkout for restricted items is forbidden 316. Self-checkout is likewise forbidden 316 if no unique identification is detected at step 308, i.e. at some point between initiation of a transaction and conclusion of payment for the transaction. If self-checkout for restricted items is forbidden 316, the interface of FIG. 4C may be displayed, which may include a user interface element 416 indicating that the self-checkout for restricted items is forbidden. The interface of FIG. 4C may further include an interface element 418 that, when selected, causes the POS 106 to transmit an alert to a customer service manager (CSM).

Figure 4D:
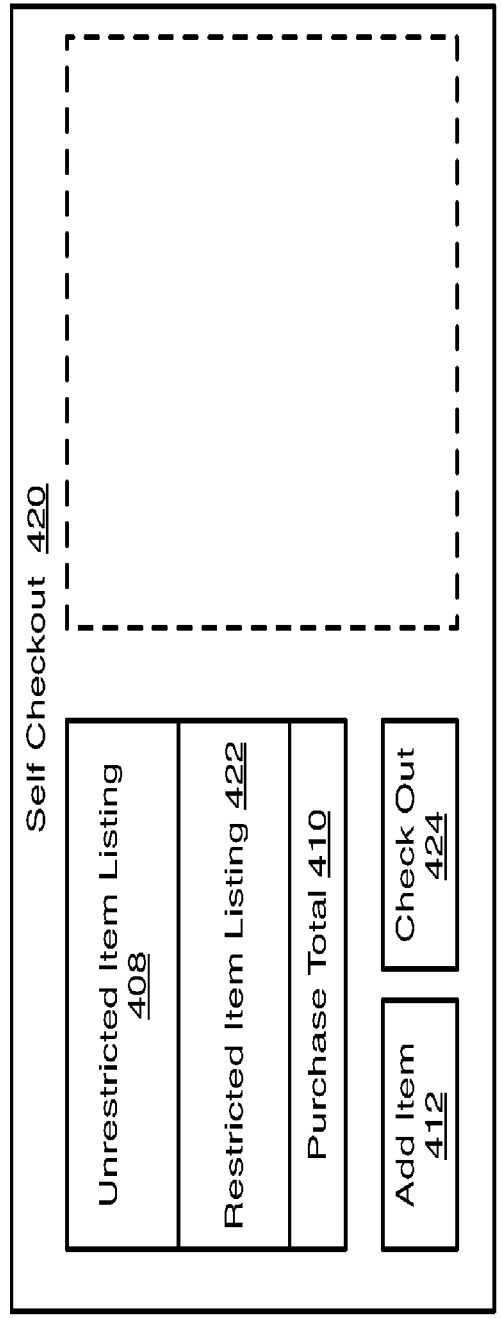

Referring to FIG. 3B, if an input is found 314 to have been received that indicates that the image corresponds to the presenter of the unique identification, then a self-checkout interface is presented 318. The self-checkout interface may be presented on the same or a different screen as the cashier interface 400. For example, the cashier may pivot a display device on which the cashier interface 400 was displayed and the POS 106 may replace the cashier interface 400 with the self-checkout interface 420 of FIG. 4D. Alternatively, the self-checkout interface 420 may be presented on a separate display device coupled to the POS 106.

The interface element 414 may include items 408-412 similar to the cashier interface 400 for listing unrestricted items and a purchase total and an interface element 412 for invoking addition of an item to the transaction. In some examples, interface elements for each of the cashier interface 400 and self-checkout interface 420 may be retrieved from or derived from a common source, such as a same location at a store database. Restricted items may be added to the transaction in the same manner as restricted items, such as by input of an identifier, scanning of a bar code, or any other means known in the art. The interface 420 may further include an interface element 422 including a listing of restricted items added to the transaction and an interface element 424 that invokes a checkout process by the POS 106. As is apparent in FIG. 4D, interface elements requiring authentication are excluded from the self-checkout interface 420. Thus, the system can distinguish between the interfaces 400, 420 with respect to establishing fields or other display elements at self-checkout interface 420 triggered by a response input establishing the authorization of the presenter of the unique identification.

Returning to FIG. 3B, using the self-checkout interface 420 the POS 106, the method 300 may further include scanning 320 a restricted item or otherwise inputting an identifier of a restricted item to the POS 106. An identifier of the restricted item received at step 320 is then transmitted 322 to the server system. If authorization for the user associated with the unique identification detected at step 308 to purchase the restricted item is found 324 to have been received, then the restricted item is added 326 to the transaction. Otherwise, step 326 is omitted.

If the user is found 328 to be done adding items to the transaction, then payment for the restricted and unrestricted items of the transaction is processed 330. If the user is not found 328 to be done, then another restricted item is scanned at step 320 and the process repeats. A user may indicate that no more restricted items are to be added by selecting the "check out" element 424. Where no unique identification is detected 308 or the user is forbidden 316 from purchasing restricted items, then processing may continue from steps 308 and 316 with the processing 330 of payment for the unrestricted items added at step 306.

Figure 5:
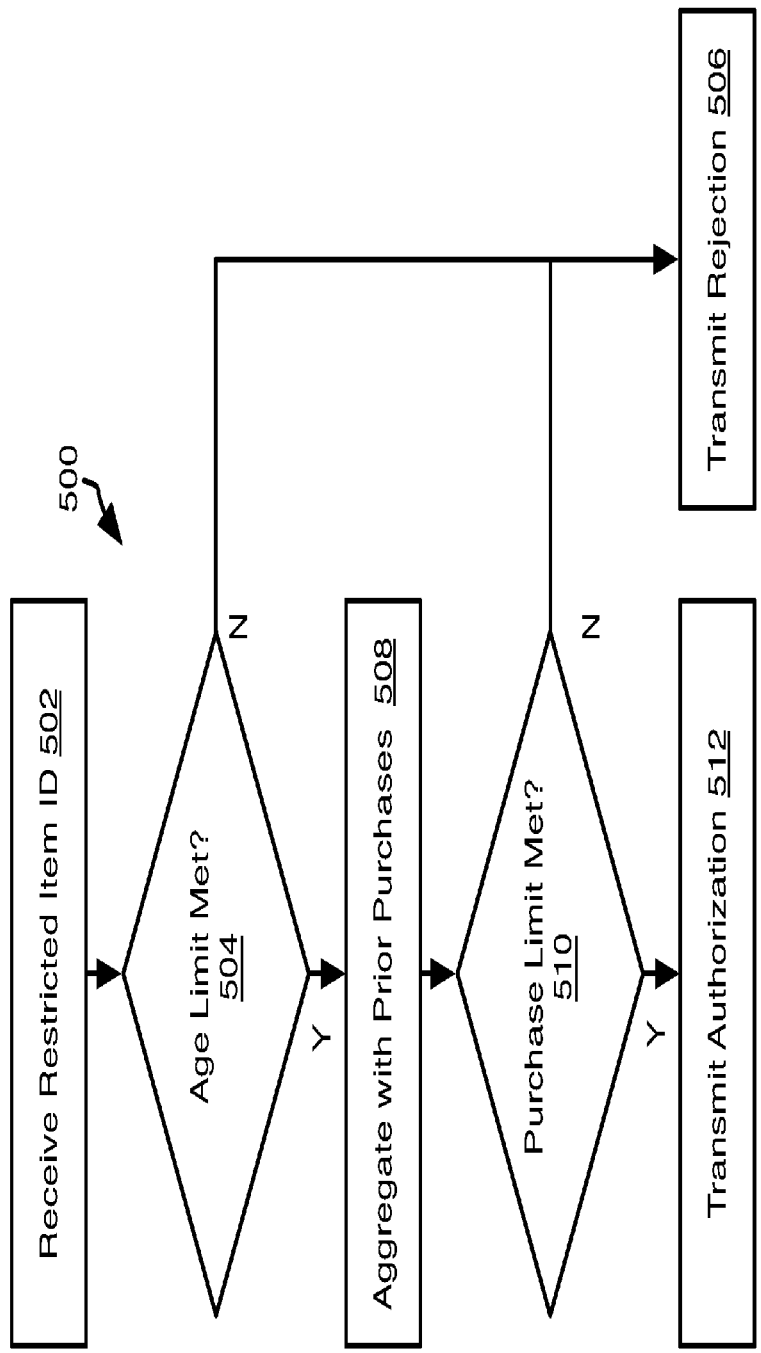
FIG. 5 is a process flow diagram of a method for authorizing transactions at a server system in accordance with an embodiment of the present invention.

Referring to FIG. 5, in response to receiving the identifier of a restricted item as transmitted at step 320, the server system 102 may execute the illustrated method 500. The method 500 includes receiving 502 the identifier of the restricted item. The message including the restricted item may be transmitted in the context of a session associated with a particular user identifier corresponding to the unique identification provided by a user at the POS may be transmitted with the identifier of the restricted item. The method 500 may include evaluating 504 whether the age 110d of the user associated with the user identifier is above an age limit associated with the restricted item in the product database 104*b*. If not, then a rejection of purchase of the restricted item is transmitted 506 to the POS 106. If so, then any other limits on the purchase of the restricted item may be evaluated.

For example, in some embodiments, transmitting 320 the restricted item identifier may include transmitting a quantity purchased. The quantity of the restricted item, or a single unit thereof if a quantity is not provided, may be aggregated 508 with past purchases of the user of that item. E.g., where the user has purchased Z units within the time window X, then an aggregate quantity A may be calculated as A=Z+Q, where Q is the quantity received at step 502. The aggregate purchase amount (A) may then be evaluated to determine 510 whether additional purchases of the restricted item are permitted. For example, where the limit during the window X is Y, then if A>Y, the purchase is determined 510 not to be permitted, a rejection is transmitted 506 to the POS indicating that purchase of the restricted item is not permitted. Otherwise, if A<=Y, authorization to purchase the restricted item is transmitted 512 to the POS 106.

Other parameters, regulations, or eligibility criteria may also be used to determine eligibility of a particular user to purchase a restricted item. Accordingly, the authorization may be transmitted 512 only after all of these criteria are determined to be satisfied.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for implementing purchasing restrictions, the method comprising:
   scanning, by a point of sale (POS) device during a transaction, unrestricted items of one or more first items to add the unrestricted items to a listing of items using a first interface, the first interface being an authenticated interface to the POS device;
   authenticating, during the transaction, a customer to purchase restricted items, including:
      detecting, by the POS device, prior to receiving payment for the one or more first items, provision by the customer of a unique customer identification;
      displaying, by the POS device, an authentication image corresponding to the unique customer identification; and
      receiving, by the POS device, an input verifying whether the authentication image corresponds to the customer that provided the unique customer identification, the method further comprising;
   in response to the input verifying that the authentication image corresponds to the customer of the unique identification, replacing, by the POS device, the first interface with a second interface, the second interface including interface elements of the first interface including listing unrestricted items during the transaction, a purchase total, and an element invoking an addition of an item to the transaction, and excluding one or more interface elements of the first interface that invoke actions requiring cashier authentication, and the second interface further including an interface element that includes a listing of restricted items added to the transaction and an interface element that-invokes a checkout process indicating a completion of the transaction;
   scanning, by the POS device using the second interface, one or more second items, the one or more second items including restricted items which are added to the listing of items; and
   processing, by the POS device, payment for both of the one or more first items and the one or more second items in the second interface, wherein:
   in response to the input indicating that the authentication image does not correspond to the customer of the unique customer identification or in the absence of a unique customer identification, the method further comprises:
   prohibiting a self-checkout of the restricted items and requiring the cashier authentication, and
   displaying a third interface that includes a display element regarding the prohibition of the restricted items.

2. The method of claim 1, further comprising:
   transmitting, by the POS device, the unique customer identification to a server system; and
   receiving, by the POS device from the server system, the authentication image.

3. The method of claim 1, further comprising:
   transmitting, by the POS device to a server system, a message identifying the one or more second items; and
   receiving, by the POS device from the server system, authorization to accept payment for the one or more second items;
   wherein processing payment for both of the one or more first items and one or more second items in the second interface is performed in response to receiving the authorization.

4. The method of claim 3, further comprising:
   receiving, by the server system, the message identifying the one or more second items; and
   for each item of the one or more second items—
      determining that past purchases of the each item plus a quantity of the each item indicated by the message does not exceed a permissible amount; and
   in response to determining that past purchases of the each item plus the quantity of the each item indicated by the message does not exceed the permissible amount, transmitting the authorization to accept payment for the each item.

5. The method of claim 3, further comprising:
   receiving, by the server system, the message identifying the one or more second items; and
   for each item of the one or more second items—
      determining that an age associated with the unique customer identification is above an age limit associated with the each item; and
   in response to determining that the age associated with the unique customer identification is above the age limit associated with the each item, transmitting the authorization to accept payment for the each item.

6. The method of claim 1, further comprising conducting a second transaction, including:
   scanning, by the point of sale (POS) device, one or more third items using the first interface;
   detecting, by the POS device, subsequent to scanning of the one or more third items and prior to receiving payment for the one or more third items, provision of a second customer identification;

displaying, by the POS device, a second authentication image corresponding to the second customer identification;
receiving, by the POS device, from a server system, an input indicating that the second authentication image does not correspond to a customer that provided the second customer identification; and
in response to the input, refraining from adding one or more restricted items to the second transaction.

7. The method of claim 1, further comprising conducting a second transaction, including:
scanning, by the point of sale (POS) device, one or more third items using the first interface;
detecting, by the POS device, subsequent to scanning of the one or more third items and prior to receiving payment for the one or more third items, provision of a second customer identification;
displaying, by the POS device, a second authentication image corresponding to the second customer identification;
receiving, by the POS device, from a server system, a second input indicating that the second authentication image corresponds to a customer that provided the second customer identification;
in response to the second input, replacing, by the POS device, the first interface with the second interface;
scanning, by the POS device using the second interface, one or more fourth items, the one or more fourth items being restricted items; and
transmitting, by the POS device to the server system, a second message identifying the one or more fourth items; and
receiving, by the POS device from the server system, refusal of authorization to receive payment for the one or more second items; and
outputting, by the POS device in the second interface, a notification that purchase of the one or more second items is refused.

8. The method of claim 7, further comprising:
receiving, by the server system, the second message identifying the one or more fourth items; and
for each item of the one or more fourth items—
determining that past purchases of the each item plus a quantity of the each item indicated by the message exceeds a permissible amount; and
in response to determining that past purchases of the each item plus the quantity of the each item indicated by the message exceeds the permissible amount, transmitting the notification that purchase of the one or more second items is refused.

9. The method of claim 7, further comprising, in response to determining that past purchases of the each item plus the quantity of the each item indicated by the message exceeds the permissible amount, transmitting, by the server system, a notification to a customer service manager.

10. The method of claim 7, further comprising:
receiving, by the server system, the second message identifying the one or more fourth items; and
for each item of the one or more fourth items—
determining that an age associated with the customer identification is below an age limit associated with the each item; and
in response to determining that the age associated with the customer identification is below the age limit associated with the each item, transmitting the notification that purchase of the one or more second items is refused.

11. A system for implementing purchasing restrictions, the system comprising:
a point of sale (POS) device including one or more processors, a display device coupled to the one or more processors, and one or more memory devices operably coupled to the one or more processors, the one or more memory devices storing executable code effective to cause the one or more processors to—
display a first interface on the display device, the first interface being an authenticated interface to the POS device
scan unrestricted items of one or more first items to add the unrestricted items to a listing of items using the first interface during a transaction;
authenticate, during the transaction, a customer to purchase restricted items, including:
detect prior to receiving payment for the one or more first items, provision by the customer of a unique customer identification;
display on the display device an authentication image corresponding to the unique customer identification; and
receive an input verifying whether the authentication image corresponds to the customer that provided by the unique customer identification;
in response to the input verifying that the authentication image corresponds to the customer that provided the customer identification is received:
(a) replace the first interface with a second interface on the display device, the second interface including interface elements of the first interface including listing unrestricted items during the transaction, a purchase total, and an element invoking an addition of an item to the transaction, and excluding one or more interface elements of the first interface that invoke actions requiring cashier authentication, the second interface further including an interface element that includes a listing of restricted items added to the transaction and an interface element that invokes a checkout process indicating a completion of the transaction,
(b) scan, using the second interface, one or more second items, the one or more second items including the restricted items which are added to the listing of restricted items, and
(c) process payment for both of the one or more first items and one or more second items in the second interface, wherein:
in response to the input indicating that the authentication image does not correspond to the customer of the unique customer identification or in the absence of a unique customer identification, prohibiting a self-checkout of the restricted items, and displaying a third interface that includes a display element regarding the prohibition of the restricted items.

12. The system of claim 11, wherein the executable code is further effective to cause the one or more processors to:
transmit the customer identification to a server system; and
receive from the server system, the authentication image.

13. The system of claim 11, wherein the executable code is further effective to cause the one or more processors to:
transmit, to a server system, a message identifying the one or more second items; and
if authorization to accept payment for the one or more second items is received in response to the message, cause the one or more processors to perform (c) with respect to the one or more second items.

14. The system of claim 13, wherein the executable code is further effective to cause the one or more processors to, if the authorization to accept payment for the one or more second items is not received, refrain from performing (c) with respect to the one or more second items.

15. The system of claim 13, further comprising the server system, the server system programmed to:
   receive the message identifying the one or more second items; and
   for each item of the one or more second items, if past purchases of the each item plus a quantity of the each item indicated by the message does not exceed a permissible amount, transmit the authorization to accept payment for the one or more second items.

16. The system of claim 15, wherein the server system is further programmed to:
   receive the message identifying the one or more second items; and
   for each item of the one or more second items, if the past purchases of the each item plus the quantity of the each item indicated by the message exceeds a permissible amount, refrain from transmitting the authorization to accept payment for the one or more second items.

17. The system of claim 16, wherein the server system is further programmed to, if past the purchases of the each item plus a quantity of the each item indicated by the message exceeds a permissible amount, transmit a notification to a customer service manager.

18. The system of claim 13, further comprising the server system, the server system programmed to:
   receive the message identifying the one or more second items; and
   for each item of the one or more second items, if an age associated with the customer identification is above an age limit associated with the each item, transmit the authorization to accept payment for the one or more second items.

19. The system of claim 18, wherein the server system is further programmed to, for each item of the one or more second items, if the age associated with the customer identification is below the age limit associated with the each item, refrain from transmitting the authorization to accept payment for the one or more second items.

* * * * *